March 25, 1930.  J. WEBB  1,752,216
CORN HARVESTING APPARATUS
Filed Aug. 5, 1926   2 Sheets-Sheet 1
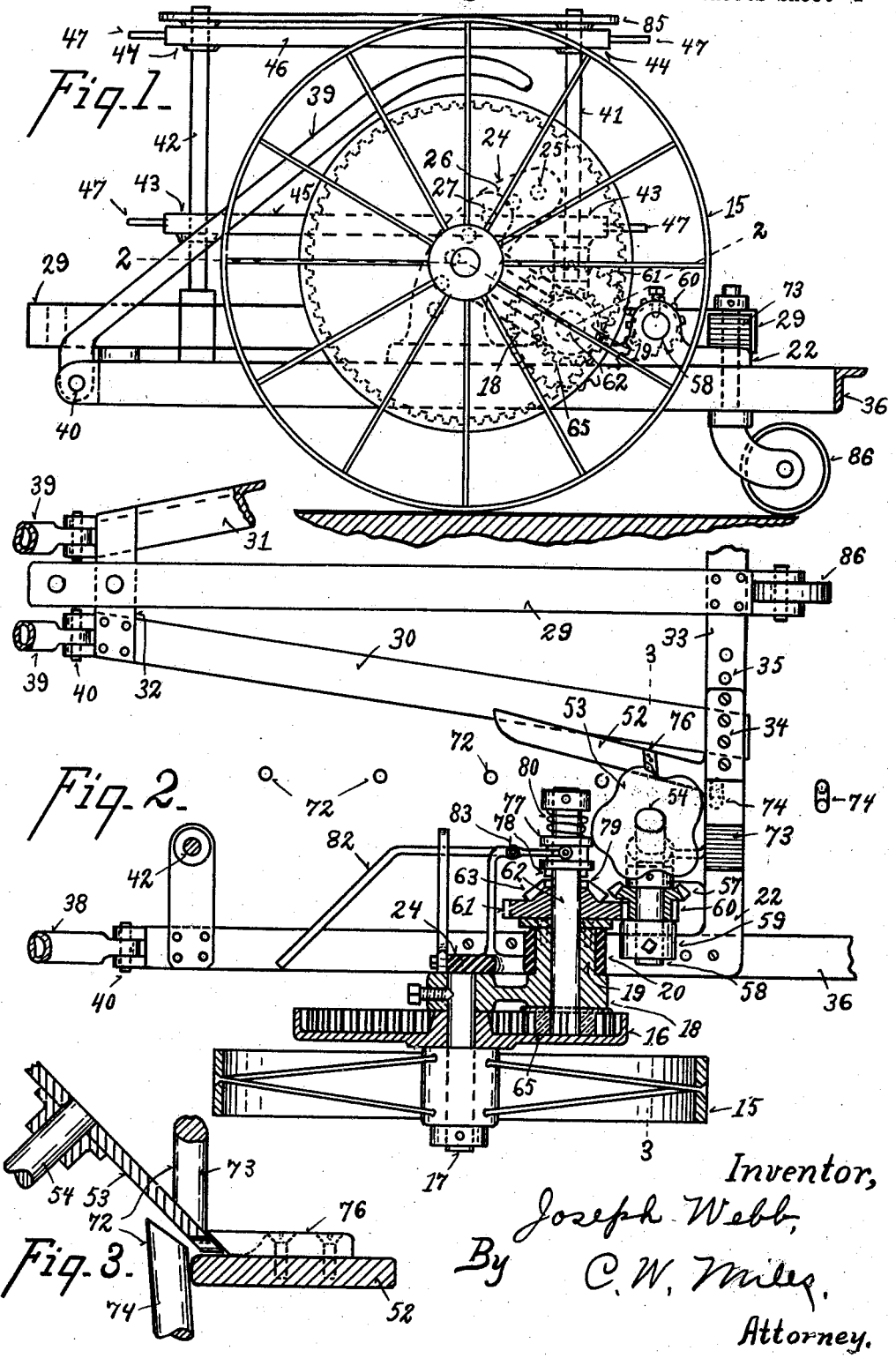

March 25, 1930. J. WEBB 1,752,216
CORN HARVESTING APPARATUS
Filed Aug. 5, 1926 2 Sheets-Sheet 2
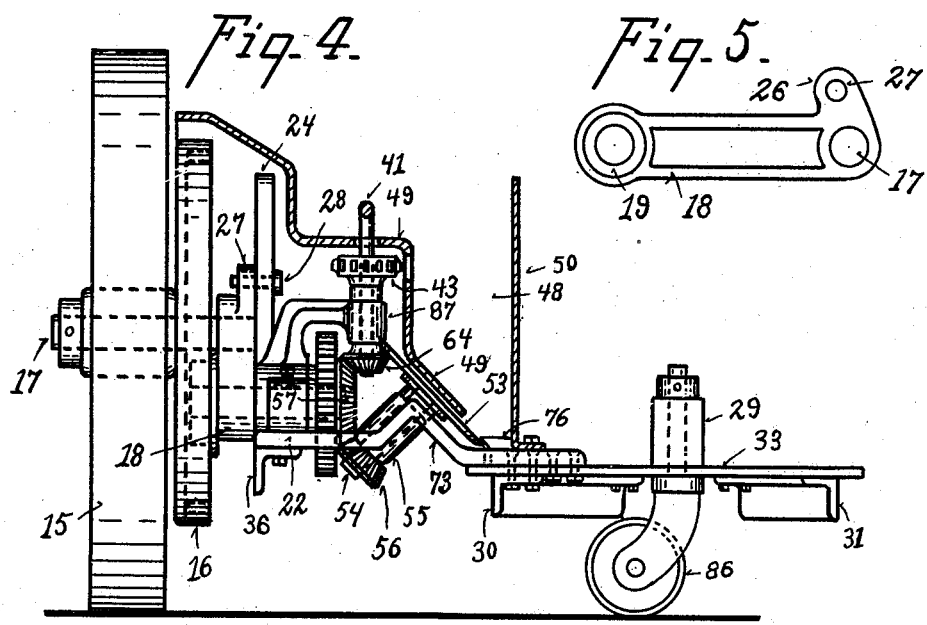
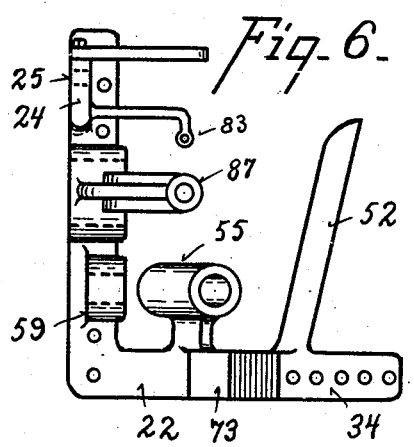
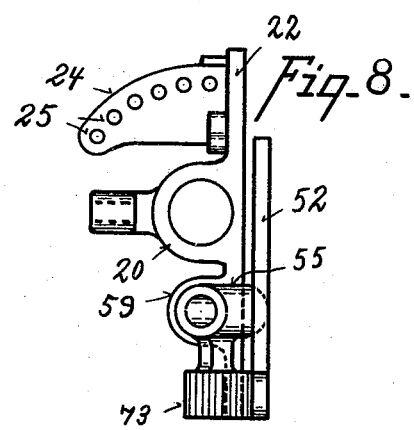
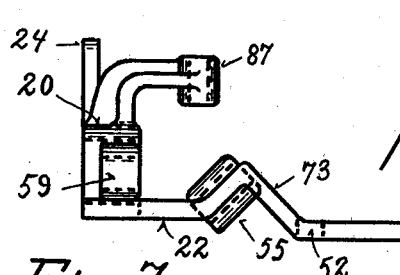
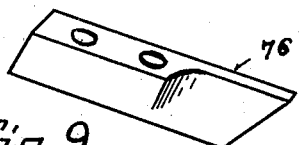
Inventor,
Joseph Webb,
By C. W. Miles,
Attorney.

Patented Mar. 25, 1930

1,752,216

UNITED STATES PATENT OFFICE

JOSEPH WEBB, OF CINCINNATI, OHIO

CORN-HARVESTING APPARATUS

Application filed August 5, 1926. Serial No. 127,426.

My invention relates to corn harvesting apparatus. One of its objects is to provide improved frame or supporting apparatus adapted to simplify and reduce the number of parts and the cost of production. Another object is to provide improved severing mechanism adapted to sever the weeds and vines as well as the corn stalks, and also adapted to sever several corn stalks at the same time, where the corn is so planted that the stalks developed two or more in a group. Another object is to provide improved means to direct weeds and vines into engagement with the severing means to insure their being severed. Another object is to provide for clearing the harvester apparatus from engagement with the unsevered portion of the corn stalks. Another object is to provide improved height adjusting means whereby the corn may be severed at any desired height above the ground. Another object is to provide for severing two rows at one operation, and for variably adjusting the apparatus to cut two rows when the rows are variably spaced apart. Another object is to provide improved pick up and feeding apparatus to pick up broken or inclined stalks, and to feed the upper portion of the stalks to the harvesting apparatus. My invention also comprises certain details of form and arrangement, and combination of components, all of which will be fully set forth in the description of the accompanying drawings, in which:

Fig. 1 is a side elevation of a corn harvester embodying my improvements.

Fig. 2 is a plan of a portion of the same, partly in section upon line 2—2 of Fig. 1.

Fig. 3 is a sectional detail through the severing apparatus taken on line 3—3 of Fig. 2.

Fig. 4 is a rear end view of Figs. 1 and 2.

Fig. 5 is a plan of an elevation adjusting link or crank arm, detached.

Fig. 6 is a plan of one of the supporting frame sections detached.

Fig. 7 is an end elevation of the member shown in Fig. 6.

Fig. 8 is a side elevation of the member shown in Fig. 6.

Fig. 9 is a perspective view of a weed deflecting finger detached.

The accompanying drawings illustrate the preferred embodiment of my invention, in which 15 represent the traction wheels, one upon each side of the frame, of which only one is shown in Figs. 2 and 3. Each traction wheel is provided with an internal gear 16 rigidly attached thereto. The wheels 15 and gears 16 are journaled upon stud shafts 17, carried rigidly by links or crank arms 18. The crank arms 18 are provided with short tubular shafts 19 which journal in bearings 20 carried by the cast frame members 22, whereby the stud shafts 17 are adjustable concentrically about the members 19, to facilitate adjusting the supporting frame to different heights above the ground, to thereby sever the corn stalks at different heights above the ground as may be desired. Each of the frame members 22 is provided with a segment 24 having a series of perforations 25 concentric with the bore of the journal bearing 20. The crank arms 18 are each provided with an ear 26 having a perforation 27 to register with any one of the perforations 25. A bolt or pin 28 serves to lock the crank arm 18 rigidly to the frame member 22 at any one of several different positions by passing the bolt 28 through the perforation 27 and through any selected one of the perforations 25.

Two frame members 22 are employed which are counter-parts or left and right hand frame members mounted respectively upon opposite sides of the centrally located draw bar 29. The supporting frame comprises, in addition to the frame members 22, the diverging angle bars 30 and 31, which are connected to the front end of the draw bar by means of a metal cross bar 32, and at their rear ends by a metal cross bar 33. The frame members 22 are provided with a series of spaced perforations 34, all or a portion of which are adapted to register with all or a portion of a similar series of perforations 35 at opposite ends of the cross bar 33, whereby the frame members may be adjusted or spaced closer together or farther apart as may be required to enable two adjacent rows of corn to be severed at one operation. The outer portions of the respective frame members 22 are attached to angle bars 36, which extend forwardly and rearwardly and serve to support apparatus for feeding the corn above the severing apparatus, and apparatus which serves to feed the corn stalks to the severing apparatus and away from the severing apparatus, and to bunch, tie, and eject the severed corn. I have not specifically illustrated this feeding, bunching, tying, and ejecting apparatus herein as the same is the subject-matter of a separate application.

Pickup members 38 and 39 are employed in pairs upon opposite sides of each corn row to pick up any bent or inclined corn stalks and to direct them into position to be severed. Each of the pickup members 38 and 39 is pivotally attached at 40 to the supporting frame and is adapted to have its free end extended forwardly of the supporting frame with its curved forward end resting upon and riding over the surface of the ground. The free ends of the pickup members 38 and 39 are adapted to be shifted to an idle elevated position as shown in Fig. 1, when the corn harvester is not in use, or when it is required to make short turns.

A vertical driven shaft 41 and a vertical idle shaft 42 are provided respectively with sprocket wheels 43 and 44 adapted to drive sprocket chains 45 and 46, which chains are provided with outwardly projecting feeding fingers 47 which engage the upper portions of the corn stalks and feed them from the pickup members toward the severing mechanism. For this purpose a feeding channel 48, see Fig. 3, having light weight sheet metal walls 49 and 50 is preferably provided along which the corn is fed to and from the severing mechanism.

Corn stalks are usually accompanied by weeds and vines, the stems of which are tough and strong and more difficult to sever than are the corn stalks, and which are required to be severed, as otherwise the operation of the harvester would be choked and interrupted. Also while the corn stalks are usually presented to the severing mechanism one at a time, it frequently occurs that two or more stalks are presented simultaneously or in a bunch, and require to be severed practically at the same time, which puts severe strains upon the severing mechanism, tending to render it unreliable or inoperative. In order to insure reliable operation of the severing mechanism under all normal conditions of operation, I provide a severing blade 52 which is stationarily mounted upon the frame member 22 in an inclined position. A severing disk 53 is journaled upon a shaft 54, the axis of which shaft is at an angle of approximately forty-five degrees to the normal or vertical axis of the corn stalks to be severed. The periphery or cutting edge of the disk 53 is corrugated or convoluted so as to provide a series of rounded cutting members so that the cutting operation is somewhat intermittent or irregular in nature, and permits the cutting edge of the disk 53 to have a draw-cutting operation or effect upon the corn and weeds to be severed.

The shaft 54 is journaled in a bearing 55 carried by the frame member 22. A beveled gear 56 at the rear end of the shaft 54 meshes with and is driven by a beveled gear 57, journaled loosely upon the stud shaft 58 which is mounted rigidly in a boss 59 carried by the frame member 22. A spur gear 60 is also mounted upon the shaft 58 and rigidly attached to the gear 57, being preferably cast integral therewith. The gear 60 meshes with and is driven by a spur gear 61 loosely mounted upon a shaft 62 which is journaled in the bore of the shaft 19 of the crank arm 18. A beveled gear 63 is rigidly attached to or formed integral with the gear 61. The gear 63 meshes with a beveled gear 64 mounted rigidly upon the lower end of the vertically disposed shaft 41, to drive the shaft 41 and through shaft 41 to drive the sprocket wheels 43 and 44 and the sprocket chains 45 and 46. The shaft 62 is provided at its outer end with a pinion 65 rigidly attached thereto, which meshes with the internal gear 16 at any position to which the gear 16 and traction wheel 15 may be adjusted relative to the frame member 22. The horse or tractor by means of which the corn harvester is drawn furnishes the power to drive the severing and feeding mechanism indirectly through the traction wheels 15.

As illustrated in Fig. 3 the corn stalks 72 successively enter a converging channel between the blade 52 and the severing disk 53 as the harvester is drawn along the corn-row, and each stalk is severed by a combined shearing and draw-cut action of the severing disk 53, while the blade 53 serves to support the corn stalks from the opposite side and force them toward and against the cutting edge of the disk 53. At the same time the angular relation of the disk 53 and blade 52 are such that the cut is made diagonally across the corn stalk, much in the same manner that corn stalks have been heretofore severed by hand using a corn knife.

As soon as the corn stalk has been severed that portion above the disk 53 and blade 52 is carried or fed away from the severing mechanism along the feed channel 48 by any known type of feeding mechanism, not shown, and if desired bunched and bound into bundles or shocks and ejected from the rear end of the harvester.

In order to clear the harvester from that portion of the corn stalk 74 below the blade 52 and disk 53, and which is left standing in the ground, I provide an upwardly directed yoke or bend 73 in the frame member 22 in rear of the disk 53 to provide a passage for the upper ends of the standing sections of the corn stalks 74, and in addition thereto, the diagonally disposed cam or blade 52 bears against one side of the corn stalk sections 74 successively and deflects them away from the disk 53 and so as to pass through the channel provided therefor by the yoke or bend 73. I also preferably provide a finger 76 attached to the upper face of the blade 52, which is rearwardly inclined so as to guide or deflect that portion of any vine or weed extending above and over the blade 52 into position to insure it being severed by the disk 53, thereby tending to prevent the harvester being obstructed or impeded by unsevered vines or weeds.

Mounted upon the shaft 62 and splined thereto is a clutch member 77, movable endwise of the shaft 62. The clutch member 77 is provided with clutch teeth 78 adapted to engage with clutch teeth 79 carried by the gear 63 to clutch the gear 63 and gear 61 in driving relation to the shaft 62. A coiled spring 80 normally holds the clutch teeth 78 and 79 in engagement, and a lever 82 adapted to be actuated by hand or otherwise and pivoted at 83 to the frame member 22 serves to disengage the clutch members 78 and 79 when required.

A guide bar 85 above the sprocket wheels 44 serves as a journal support for the upper ends of the shafts 41 and 42, and to fend the upper ends of the corn stalks away from the chains 45 and 46. A caster wheel 86 is employed to support the central rear portion of the harvester frame. A sheet metal member 49, see Fig. 4, serves as a gear housing and to fend the corn stalks away from the gears and upper portion of the rotary disk 53. It also serves as one side of the guideway or channel 48 along which the corn stalks are fed to and from the severing apparatus. The opposite side of the guideway 48 may comprise a vertical sheet metal wall 50, or if desired an open-work wall built up of a series of vertical and longitudinal guide-bars in place of the sheet metal member 50. The bearing 87 for the lower end of the shaft 41 is preferably formed integral with the frame member 22.

The apparatus herein shown and described is capable of considerable modification within the scope of the claims without departing from the spirit of my invention.

What I claim is:

1. Corn harvesting mechanism comprising a supporting frame adapted to move along the corn row, a blade mounted stationarily upon said frame and adapted to engage one side of the members to be severed, a rotary cutter mounted in relation to said blade to sever the members to be severed above said blade and diagonally of the members to be severed and means for deflecting the standing portions of the cut members during the passage of the mechanism.

2. Corn harvesting mechanism comprising a supporting frame adapted to move along the corn row, a blade mounted stationarily upon said frame and adapted to engage one side of the members to be severed, a rotary cutter mounted in relation to said blade to sever the members to be severed above said blade and diagonally of the members to be severed, and a stationarily mounted deflector member rising above said blade and adapted to deflect the members to be severed into engagement with said rotary cutter.

3. Corn harvesting mechanism comprising a supporting frame adapted to move along the corn row, a blade mounted stationarily upon said frame and adapted to engage one side of the members to be severed, a rotary cutter mounted in relation to said blade to sever the members to be severed above said blade, and diagonally of the members to be severed, said blade having an engaging face to engage the standing portions of the members to be severed below said cutter and to deflect said standing portions laterally out of engagement with said cutter.

4. Corn harvesting mechanism comprising a supporting frame adapted to move along the corn row, a blade mounted upon said frame and provided with a corn engaging face disposed diagonally relative to the corn row and adapted to engage one side of the members to be severed, a serrated rotary cutter mounted in relation to said blade to sever the members to be severed above said blade and diagonally of the members to be severed, and deflecting members rising above said blade and defining a channel in relation to said cutter to deflect the members to be severed into the path of the serrations of said cutter.

5. Corn harvesting mechanism comprising a transversely adjustable supporting frame adapted to move along the corn row, a blade mounted upon said frame and provided with a corn engaging face disposed diagonally relative to the corn row and adapted to engage one side of the members to be severed, and a serrated rotary cutter mounted in an inclined position relative to the corn row and in relation to said blade to sever the corn above said blade and diagonally of the corn stalks.

6. Corn harvesting mechanism comprising a supporting frame adapted to move along the corn row and provided with an upwardly directed yoke to provide a channel for the passage of the standing sections of the corn stalks, a blade mounted upon said frame and provided with a diagonally disposed corn engaging face adapted to support one face of the corn stalks through the severing operation, and to deflect the standing sections of the corn stalks away from the cutter and through said channel in the frame after the severing operation, and a serrated rotary cutter mounted in an inclined position relative to the corn row and in relation to said blade to sever the corn above said blade and diagonally of the corn stalks.

7. Corn harvesting mechanism comprising a supporting frame adapted to move along the corn row, corn severing mechanism mounted upon said frame, a crank-arm journaled to said frame, a perforated projection at the free end of said crank-arm, a segment carried by said frame and provided with a series of perforations adapted to register with the perforation at the free end of said crank arm to enable said crank arm to be adjusted and locked to different positions relative to said frame, a stud shaft carried by the free end of said crank arm, a traction wheel provided with a driving gear journaled loosely upon said stud shaft and adjustable therewith relative to said frame, a shaft journaled concentrically relative to said crank arm and provided with a pinion in mesh with and adapted to be driven from the gear on the traction wheel, and driving mechanism driven through said concentrically journaled shaft to actuate the corn severing mechanism.

8. Corn harvesting mechanism comprising a supporting frame adapted to move along the corn row, a blade mounted upon said frame and provided with a corn engaging face disposed diagonally relative to the corn row and adapted to engage one side of the corn stalks, a rotary cutter mounted in an inclined position relative to the corn row and in relation to said blade to sever the corn above said blade and diagonally of the corn stalks, a traction wheel provided with a driving gear and loosely journalled upon a stud shaft adjustable vertically relative to said frame, a pinion engaged and driven by the gear on said traction wheel, a pinion shaft journaled to said frame, and driving mechanism connecting said pinion shaft in driving relation with said rotary cutter.

9. In a corn harvesting mechanism a frame member adapted to move along the corn row and comprising an angular frame having a channel at its rear end for the passage of the standing sections of the corn stalks, a blade to engage the corn stalks, and an angularly disposed journal for the shaft of a rotary cutter, and along its side a journal for an adjustable crank arm and a segment having a series of perforations concentric with said journal.

In testimony whereof I have affixed my signature.

JOSEPH WEBB.